United States Patent [19]

Arnoldt

[11] 4,316,072
[45] Feb. 16, 1982

[54] APPARATUS FOR POSITIONING AND SECURING COMPONENTS OF A WORKPIECE

[75] Inventor: Peter J. Arnoldt, Clairton, Pa.

[73] Assignee: Ductmate Industries, Inc., Pittsburgh, Pa.

[21] Appl. No.: 76,207

[22] Filed: Sep. 17, 1979

[51] Int. Cl.³ .................... B23K 11/10; B23K 11/32; B23K 37/04

[52] U.S. Cl. ................. 219/86.24; 219/103; 219/161; 228/44.1 R

[58] Field of Search ............... 219/86.24, 90, 89, 103, 219/158, 161, 56.1, 56.22; 228/44.1 R, 212, 213

[56] References Cited

U.S. PATENT DOCUMENTS

| | | |
|---|---|---|
| 1,464,207 | 8/1923 | Ledwinka . |
| 1,714,867 | 5/1929 | Grross . |
| 2,441,438 | 5/1948 | Mulder . |
| 2,473,633 | 6/1949 | Brown, Jr. . |
| 2,504,753 | 4/1950 | Suydam, Jr. ............... 219/56.22 |
| 2,535,946 | 12/1950 | Mulder . |
| 2,787,700 | 4/1957 | Kalbow . |
| 3,397,299 | 8/1968 | Ciranko ............... 219/89 X |
| 3,553,419 | 1/1971 | Garver ............... 219/103 X |
| 4,114,017 | 9/1978 | Smith ............... 219/90 |
| 4,129,292 | 12/1978 | Pohto et al. ............... 219/161 X |
| 4,215,262 | 7/1980 | Brastow ............... 219/103 X |

FOREIGN PATENT DOCUMENTS

| | | | |
|---|---|---|---|
| 54-27183 | 9/1979 | Japan ............... | 219/86.24 |
| 189969 | 1/1967 | U.S.S.R. ............... | 219/103 |

*Primary Examiner*—Gene Z. Rubinson
*Assistant Examiner*—Keith E. George
*Attorney, Agent, or Firm*—Stanley J. Price, Jr.; John M. Adams

[57] ABSTRACT

A workpiece positioning and securing apparatus includes a fixed frame for slidably supporting a welding machine into and out of a preselected position relative to a pair of workpiece components to be welded together. A first workpiece component is fixed by a clamping device on the frame. A second workpiece component is supported by a positioning member that is movable with the welding machine into a predetermined position relative to the first workpiece component. A pair of piston cylinders actuate the clamping device to fixedly engage the first workpiece component. A second pair of piston cylinders on the frame are operable to simultaneously move the welding machine and the second workpiece component into a preselected position relative to the first workpiece component. After the desired spacial relationship between the first and second workpiece components is attained, a pivotal welding tong is moved to a position opposing a fixed welding tong with the first and second workpiece components secured in abutting relation between the welding tongs. The welding machine is actuated to spot weld the first and second workpiece components together. The spot weld is located at a preselected distance from the point where the second workpiece component is supported by the positioning member.

9 Claims, 7 Drawing Figures

APPARATUS FOR POSITIONING AND SECURING COMPONENTS OF A WORKPIECE

BACKGROUND OF THE INVENTION

1. Field of the Invention

This invention relates to a workpiece positioning and securing apparatus and more particularly to apparatus for positioning and securing a pair of workpiece components to be connected together in a predetermined special relation and for moving a securing device such as a welding machine into a position relative to the first and second workpiece components for securing the members at a predetermined location.

2. Description of the Prior Art

Devices for positioning workpiece components for fastening or securing the components in a preselected manner are well known in the art. For example U.S. Pat. No. 2,787,700 illustrates and discloses a work feeding and positioning mechanism for feeding a part to two operative positions relative to a pair of welding electrodes of a welding apparatus. A carriage is reciprocated toward and away from the welding electrodes and includes a work holder for carrying a part to and accurately positioning it between the electrodes for welding of a pair of contacts thereon. The work holder is mounted on the carriage for transverse movement thereof. The length of the transverse movement of the work holder on the carriage is adjustable whereby the work holder accurately locates the part successively in two positions while the two contacts are sequentially welded thereto in a predetermined spaced relation to each other.

U.S. Pat. No. 1,714,867 discloses a welding apparatus adapted for use in the construction of sheet metal shells and particularly internally trusssed sheet metal doors. The trussed sheet metal doors include a truss structure first welded to a back plate and the truss structure is welded to a front plate. The back plate is placed on a table between rails and the trussed structure is placed on top of the back plate. The rails are adjusted and secured by bolts to permit the door to be moved between the rails. A main feed mechanism positions the door in respect to the electrodes for the first spot welding operation. A lower electrode remains fixed while an upper electrode is manually operated to move into position relative to the lower electrode for forming the spot weld operation of the welding mechanism. The operation is sequential in that the sheet metal door members are first initially moved to a position with respect to the electrodes followed by the step of clamping the back plate and trussed structure together by the movement of the upper electrode in respect to the lower electrode. With the members in a predetermined position a row of spot welds are made along the length of the door at a preselected distance from each other. After one row of spot welds are made the door is moved to a position for making a second row of spot welds.

U.S. Pat. No. 1,464,207 discloses an assembling and welding jig for assembling and electrically welding the parts of automobile bodies. A positioning member is operable to position a cowl panel and hold it correctly positioned with reference to the framework of the jig and body frame members to which it is to be welded. The positioning member is arranged to be swung into and out of an operative position to permit the removal of the body frame and cowl from the welding jig and the insertion of a body frame and cowl panel to be connected together.

While it has been suggested by the prior art devices to move a pair of components into a preselected position for fastening together as by welding or the like, the prior art devices require the components to be moved by a carrier type mechanism into a predetermined position relative to a welding machine that remains fixed relative to the components. Once the components are located in the predetermined position the electrodes of the welding machine are moved into an operative position with respect to the components for welding. This arrangement is cumbersome and is not readily adaptable to welding and other fastening operations where movement of the welding machine from place to place to carry out the welding operation is required.

Portable spot welders are known such as illustrated and described in U.S. Pat. Nos. 2,441,438 and 2,535,946. The spot welders disclosed in these patents are designed to be manually moved from place to place to perform spot welding operations. The portable spot welder includes a pair of electrodes or tongs in which welding tips are provided at the end of the tongs and are adapted to be pressed toward each other against the components of a workpiece disposed therebetween. A lower tong is fixed, and an upper tong is pivotally connected to a cap of the welder to be moved by a toggle mechanism into contact with one surface of the workpiece.

With the above described portable spot welding apparatus the workpiece components must be initially positioned in a predetermined relationship to each other for spot welding. Generally this is done manually and with the aid of clamps and other devices to secure the components together before they can be welded. Not only is this operation time consuming but requires a number of operating personnel. Therefore there is need for a positioning apparatus in combination with fastening devices, such as spot welders and the like, that are readily movable from place to place and provide for precise positioning of the components relative to the welding or securing machine in an efficient manner that reduces the time for the spot weld to be made and the number of operating personnel to carry out the spot welding operation.

SUMMARY OF THE INVENTION

In accordance with the present invention there is provided apparatus for supporting the two workpiece components that includes a frame. Guide means are provided for slidably supporting a welding machine to move longitudinally on the frame into and out of a predetermined position for welding. Clamping means secured to the guide means is operable to engage a first workpiece component in a fixed position relative to the welding machine. The clamping means is movable into and out of engagement with the first component. A support or positioning member is secured to the welding machine and is adapted to abut and move a second workpiece component into a predetermined position for welding to the first component. Actuating means mounted on the frame and connected to the welding machine moves the welding machine on the guide means and simultaneously moves the positioning member into abutting relation with the second workpiece component. Further movement of the positioning means moves the second component a predetermined position for welding to the first component. The support or positioning member connected to the welding machine is arranged to move the second workpiece component relative to the first component which is fixidly engaged by the clamping means to obtain the predetermined position between the workpiece first component and the second component.

A piston cylinder assembly mounted on the frame is connected through a linkage to the clamping means and is operable to move the clamping means into and out of clamping engagement with the first component so as to fixedly position the first component relative to the frame. The clamping means includes an upper and lower clamp arm. The lower clamp are is fixed to the frame and extends a preselected distance forwardly of the frame. The upper clamp arm includes a pair of arm that are pivotally connected to a forward extension of the fixed frame above the lower clamp arm. The lower clamp arm and the pair of upper clamp arms have outer ends bent toward each other to provide tips which face each other and are adapted to be engaged with the first member positioned between the engaging tips. The upper clamp arms are pivotally connected to the fixed frame and the inner ends of the upper clamp arms are pivotally connected by link arms to the end of a reciprocating piston rod of a piston cylinder having a cylinder portion that is pivotally secured to the fixed frame. Upon actuation of the piston cylinder assembly, the piston rod thereof extends to pivot the upper arm members on the fixed frame downwardly into engagement with the first component and maintain a force on the upper clamp arms to fixedly engage the first component between the clamping tips of the upper and lower clamp arms.

The guide means for the frame includes a pair of angle members positioned in abutting relation with the welding machine. The angle members have upper and lower surfaces adapted to slidably receive a pair of upper and lower flanges that are secured in spaced parallel relation to each side of the welding machine. With this arrangement, the frame angle members are positioned between the upper and lower pair of flange members which are operable upon actuation of the actuating means to reciprocate the welding machine back and forth on the angle members. The angle members are suitably supported in a fixed position relative to the components to be secured by welding.

The actuating means for longitudinally reciprocating the welding means of the welding machine includes a pair of piston cylinder assemblies each having a cylinder portion rigidly secured to the frame angle members and a movable piston rod extending therefrom and having end portions connected to the welding machine. With this arrangement, the piston rods are initially extended for positioning the welding machine in a rearmost position on the frame. Actuation of the piston cylinder assemblies retracts the piston rods thereby advancing the welding machine forwardly on the frame.

A support or positioning member extends forwardly from the welding machine and is secured thereto to move with the welding machine. The positioning member has a preselected configuration for abutting and moving the second workpiece component forwardly relative to the first component. The first component is secured relative to the frame by the clamping means and the second component is moved relative to or on the first component by movement of the positioning member relative to the frame. Initially, the first and second components are brought into contact with each other and the first component is then secured by the clamping means in a fixed position. Upon actuation of the actuating means the positioning member is moved into abutting relation with the second component and moves the second component forwardly until the first and second components are positioned in a preselected position relative to each other. This position may be attained by the force exerted on the second component by the positioning member. The actuating means is operable to advance the second component on the first component until this preselected force or resistance is exerted by the second component. This force is reached when the second component has reached the predetermined seated position on the first component for welding.

The welding machine includes upper and lower spot welding tongs. The lower tong is fixed to the welding machine a preselected distance forwardly of the positioning member in underlying relation with the first and second components to be welded. The upper tong is movable on the welding machine into and out of the spot welding position relative to the lower tong by a suitable linkage arragement. The outer ends of the tongs are bent toward each other and include spot welding tips which face each other. In the operative position where the upper tong is pivoted downwardly toward the lower tong, the welding tips are pressed toward each other against the first and second components to provide electrical contact. Preferably prior to the downward pivoting of the upper tong, the first and second components are in the predetermined position for welding so that when the upper tong reaches its final pivoted position, the welding machine is actuated to spot weld the components together in a precisely determined location.

Accordingly, the principle object of the present invention is to provide apparatus for positioning a pair of workpiece components to be secured together where one component is maintained in a fixed position relative to a second component that is moved to a precise preselected position relative to the first component so as to permit precise control of the location where the components are secured to each other.

Another object of the present invention is to weld two workpiece components together by welding apparatus that includes a clamping apparatus for fixing a first component and moving the welding machine together with the second component where movement of the welding machine through a positioning member urges the second component into a predetermined position relative to the first component for optimum spot welding of the components together at a preselected location.

These and other objects of the present invention will be more completely disclosed and described in the following specification, accompanying drawings and the appended claims.

DESCRIPTION OF THE PREFERRED EMBODIMENT

Referring to the drawings and particularly to FIGS. 1-4, there is illustrated apparatus generally designated by the numeral 10 for supporting a pair of workpiece components 12 and 14 in a predetermined position for spot welding by a welding machine generally designated by the numeral 16. The welding machine 16 is a portable spot welder of the type illustrated and described in U.S. Pat. Nos. 2,441,438 and 2,535,946. The complete details of the welding machine will not be described, and these patents are incorporated herein by reference. Generally, the welding machine 16 includes a rectangular body 18 made up of a plurality of laminations of soft iron or other suitable magnetic material which constitutes the core of a transformer. A primary coil (not shown) of the transformer includes suitable wires to supply a current to the primary coil from a source of alternating current. A secondary coil is positioned in openings provided in the core laminations.

The welding machine body portion 18 includes a front end portion 20 and a rearward end portion 22. The front end portion includes a cap 24 provided with an opening 26 through which a lower spot welding tong 28 extends. The lower tong 28 is fixed in a suitable manner as above described in the incorporated patents in the cap 24. Suitable insulation is positioned between the lower tong 28 and the cap 24 to insulate the fixed tong 28 from the body portion 18 of the welder 16.

The welding machine 16 also includes an upper tong 30 that is secured to a bracket 32 which is pivoted within a pair of upstanding, parallel spaced arm members 34 by a pin 36 extending transversely between the arm members 34. A bolt 38 is adjustably secured to the bracket 32 and is connected by a transverse pin 40 to a pair of link members 42. The opposite end of the link members 42 are connected by a pivot pin 44 to the end of a piston rod 46 of a piston cylinder assembly 48. A second pair of link members 50 are pivotally connected at one end by a pivot pin 52 to the arm members 34 and at the opposite end to the pivot pin 44. Thus with this arrangement, a plurality of transverse pivot pins 40, 44 and 52 are positioned in parallel relation. Upon actuation of the piston cylinder assembly 48, the piston rod 46 is extended outwardly to pivot the pairs of link arms 42 and 50 about the pivot pins 40, 44 and 52 to pivot the arm members 34 on the pin 36. Consequently, the upper tong 30 is moved toward the lower or fixed tong 28 by pivoting of the bracket 32 between the arm members 34.

The tongs 28 and 30 include outer ends 54 and 56 respectively that are bent toward each other. The tong outer ends 54 and 56 are provided with substantially conical spot welding tips 58 and 60 respectively which face each other and are adapted to be pressed toward each other against the components of the workpiece positioned therebetween for spot welding of the components to each other. With this arrangement, the welding tip 58 of tong 28 remains fixed while the welding tip 60 of tong 30 is moved toward and away from the lower welding tip 58.

Figure 1:
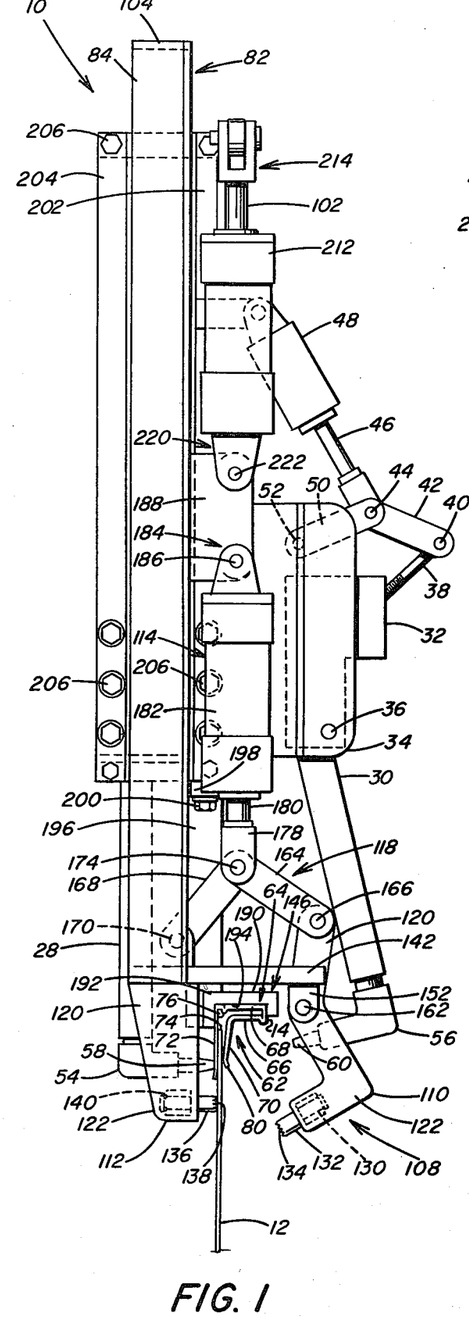
FIG. 1 is a view in side elevation of apparatus for positioning a two component workpiece in a predetermined position for welding, illustrating both components of the workpiece in the initial position on the apparatus.
Figure 2:
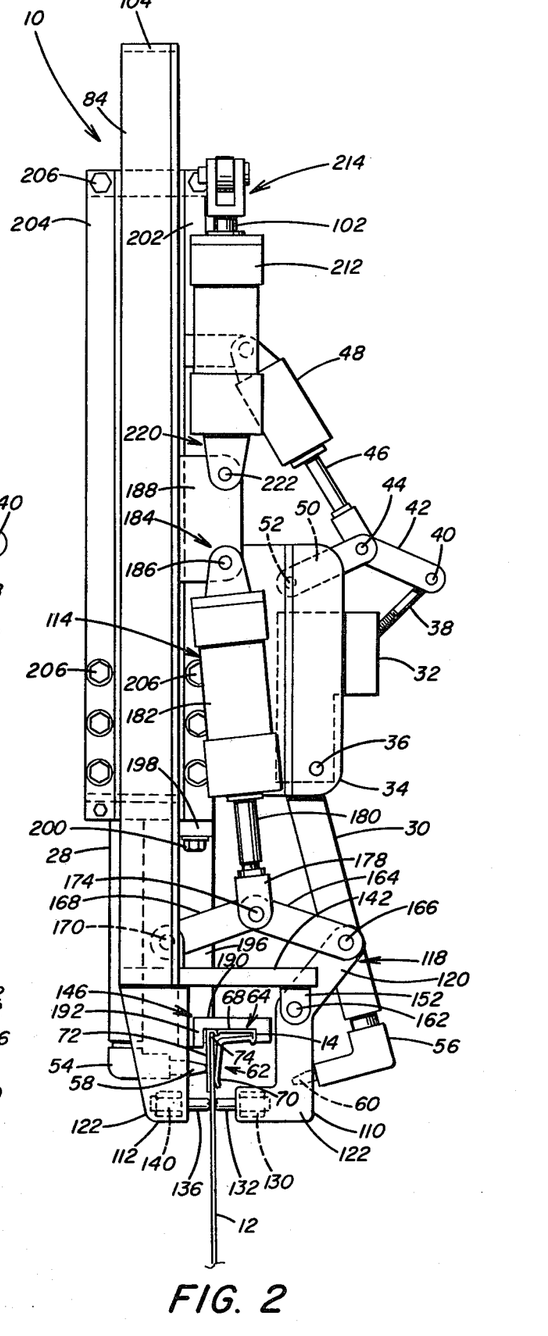
FIG. 2 is a view similar to FIG. 1, illustrating one component of the workpiece securely clamped and the second component in the predetermined position relative to the first component for welding the components to each other.
Figure 3:
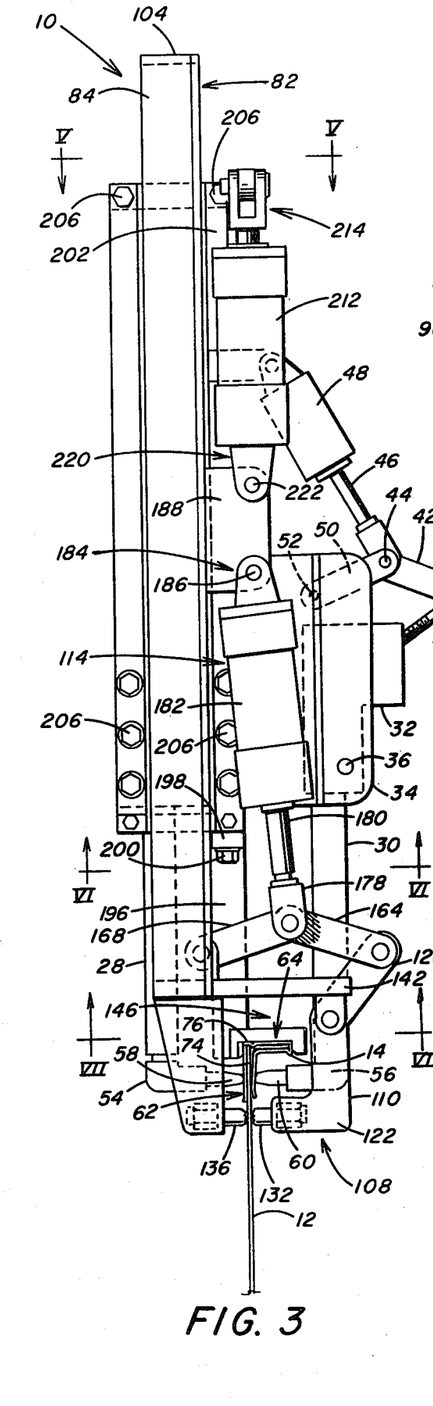
FIG. 3 is a view similar to FIG. 1, illustrating welding tongs having welding tips contacting one component of the workpiece at a predetermined location to spot weld the components to each other.

As illustrated in FIG. 3 the welding tips 58 and 60 are in their operative position with the first and second workpiece components 12 and 14 positioned therebetween for spot welding. Prior to actuation of the piston cylinder assembly 48 to downwardly pivot the tong 30, the tong 30 is maintained in a raised position as illustrated in FIG. 1 which illustrates the initial positioning of the first and second components 12 and 14 with respect to each other. Further as illustrated in FIG. 2, the tong 30 remains in an upward pivoted position as the second component 12 is moved in accordance with the present invention into a predetermined position for welding to the first component 12. This operation will be described hereinafter in greater detail.

The present invention is particularly adaptable for spot welding the ends of sheet metal duct sections to angular frame members utilized in connecting duct sections to each other. In the drawings, the first component 12 is representative of the end of a sheet metal duct section and the second component 14 is representative of a portion of the flange type frame. In a manner explained in greater detail in United States application 933,179 entitled "A Flange Type Duct Joint Assembly And Seal Arrangement Therefor" the frame member 14 is secured to the end of the sheet metal duct section 12. As illustrated in FIGS. 1-3, where the duct section is rectangular the frame member 14 has a four connected legs with a flange type configuration in section that include a duct receiving leg portion 62 and an upstanding channel shaped leg portion 64. The upstanding channel shaped leg portion 64 includes a front wall 66 and a rear wall 68 spaced from the front wall 66 to provide an opening therebetween. The duct receiving leg portion 62 includes an inclined top wall 70 with an upturned lip portion 80 and a bottom wall 72 arranged to receive an end portion of sheet metal duct section 12 therebetween. Preferably, a deformable flowing type gasket material 76 is positioned in the flange portion of the frame member 14 abutting the channel shaped leg portion rear wall 68 and the duct receiving leg portion bottom wall 72.

In accordance with the present invention, the duct end portion 74 is inserted into the duct receiving leg portion 62 so that the end portion 74 abuts the channel shaped leg portion rear wall 68 to partially displace the deformable gasket material 76 inside the leg portions 62 and 64. In this manner, the gasket material 76 flows into sealing relation around the edge of the duct end portion 74 in the duct receiving leg portion 62.

As well known in the art, the sheet metal duct is formed by duct walls positioned at right angles to each other, and a leg of the frame member 14 is positioned on the end of each duct sidewall. The first component 12 is intended to illustrate one of the duct sidewalls and the second component 14 is intended to illustrate one leg of the frame member. The flange type leg portions forming the frame member 14 are secured to each other by angular corner pieces (not shown) that extend into the upstanding channel shaped leg portions 64 of adjacent flange portions. Then the ends of a pair of sheet metal duct sections each having a frame member 14 secured thereto are secured together by connecting the upstanding flange portions and cornerpieces of the metal duct section to mating flange portions and cornerpieces of a frame secured to the other sheet metal duct section.

The duct sections are secured together by the thus formed frame members in a manner to provide an airtight seal between the ends of the duct sections and the frame members. Thus to insure that the edge of the duct end portion 74 remains in abutting relation with the rear wall 68 of the channel shaped leg portion 64 to maintain an air-tight seal between the duct end portion 74 and the channel shaped leg portion rear wall 68, the flange duct receiving leg portion 62 is secured preferably by spot welding to the duct end portion 74.

Figure 4:
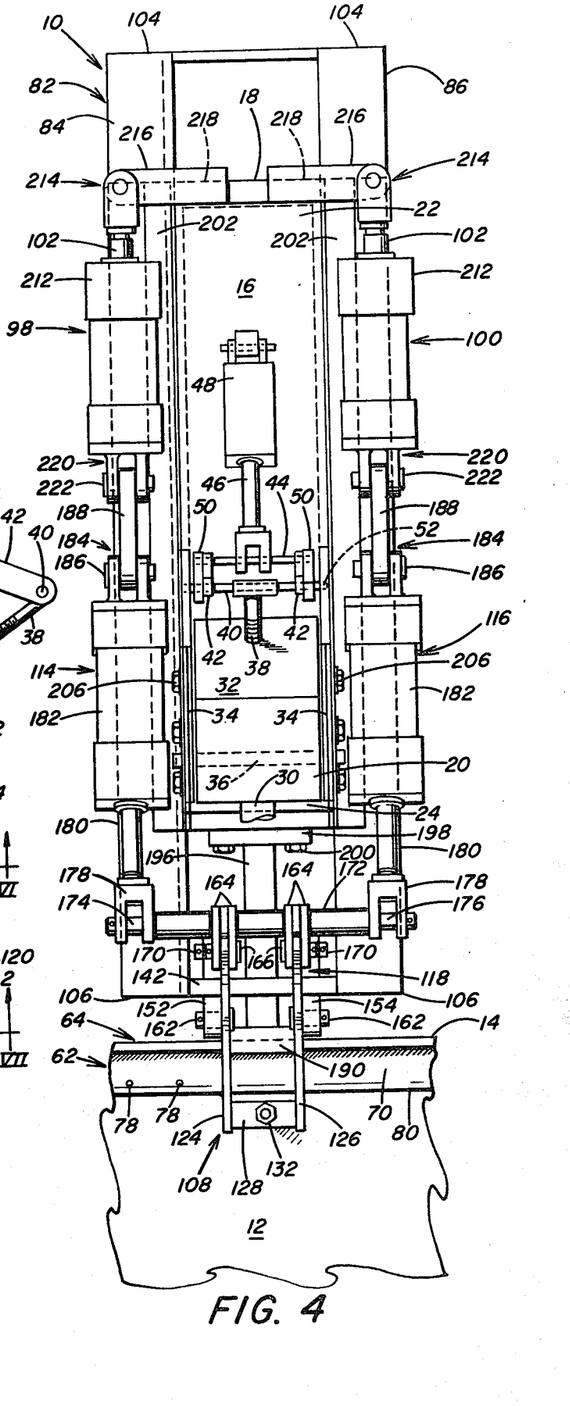
FIG. 4 is a top plan view of the workpiece positioning apparatus shown in FIG. 3, illustrating the welding machine in the position on the frame for spot welding the components of the workpiece.

As illustrated In FIG. 4, the frame flange portion 14 and the sheet metal duct section 12 are spot welded together by a plurality of spot welds spaced longitudinally the length of the frame flange portion 14. The number of spot welds 78 formed is selective and is determined, by the sealing requirements for the air pressure to be maintained in the duct. For example, the greater the air pressure within the duct the greater the number of welds 78 made along the duct to insure an air-tight connection between the duct and the frame.

In accordance with the present invention each spot weld is precisely located in a predetermined position along the flange portion 14. Each spot weld 78 is located on the duct receiving leg portion top wall 70 a preselected distance from the channel shaped leg portion rear wall 68. Most preferably, each of the spot welds 78 are located in the predetermined position adjacent upturned lip portion 80 of the duct receiving leg portion top wall 70 where the adjacent surfaces of the top wall 70, the duct end portion 74 and the duct receiving leg portion bottom wall 72 are in abutting relation. The spot weld 78 located in this position provides a weld where all three metal surfaces are in contact and eliminates any air gaps between the metal surfaces. It should be understood, however, even though the present invention is illustrated for the spot welding of flange portions to sheet metal duct sections, it will be apparent that the present invention is adaptable for welding members of a variety of configurations where there is a need for locating the spot weld at a predetermined location on two separate component parts.

Now referring in greater detail to the apparatus 10, as illustrated in FIGS. 1–4, the welding machine 16 is supported for longitudinally reciprocal movement on a fixed frame generally designated by the numeral 82. The frame 82 may be fixed in a preselected position, that is either for vertical reciprocal movement of the welding machine 16, as illustrated in the figures or for horizontal movement of the welding machine 16 where the frame 82 is fixed in a horizontal plane and the welding machine 16 is movable thereon in a horizontal plane.

Figure 5:
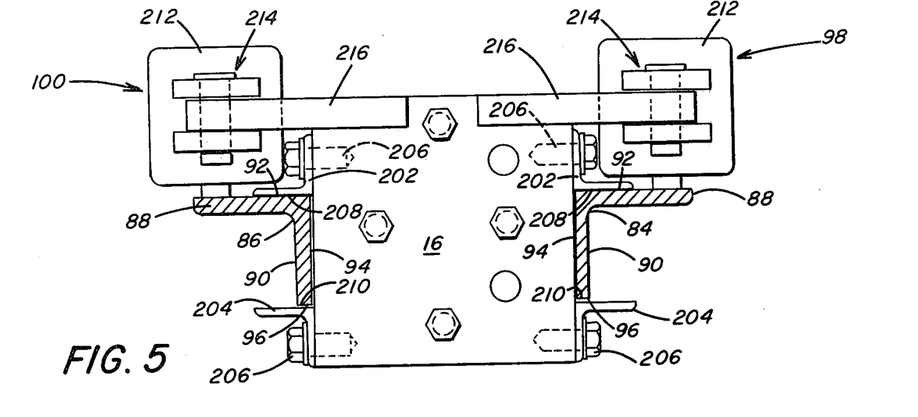
FIG. 5 is a partial sectional view taken along line IV-IV V-V of FIG. 3, illustrating the arrangement for slidably supporting the welding machine on the frame.
Figure 6:
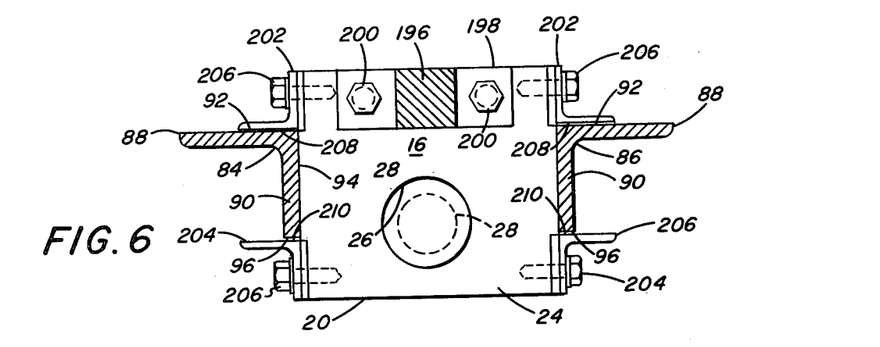
FIG. 6 is a partial sectional view taken along line VI-VI of FIG. 3, illustrating the connection of the positioning member to the welding machine.
Figure 7:
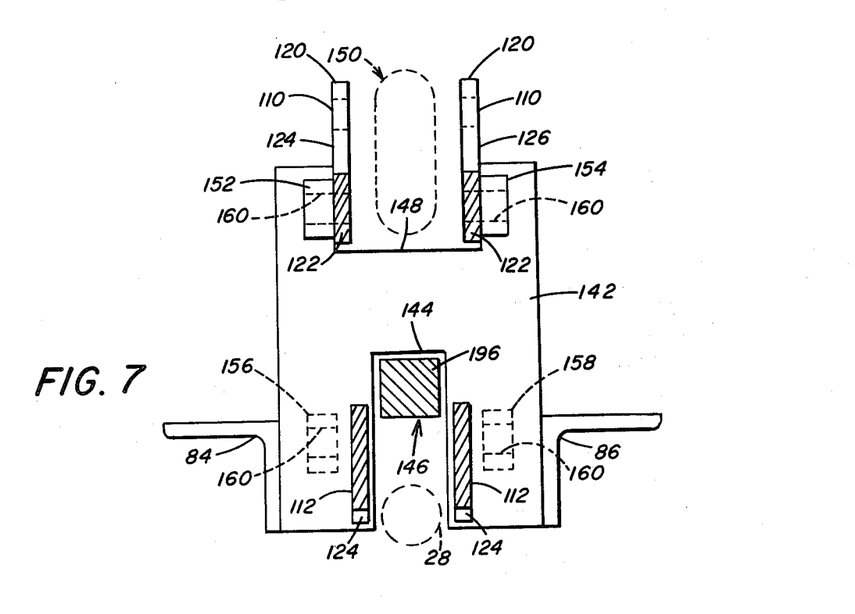
FIG. 7 is a partial sectional view taken along line VII-VII of FIG. 3, illustrating by the dashed lines the relative position of the fixed lower welding tong and the range of the pivotal movement of the upper welding tong with respect to the frame and the spaced relation between the upper welding tong and the frame.

The fixed frame 82 includes a pair of angle shaped guide members 84 and 86 as illustrated in FIGS. 5–7. Each of the guide members 84 and 86 includes leg portions 88 and 90 that are positioned at right angles to each other and include a plurality of slide surfaces 92, 94 and 96 which are arranged to facilitate slidable reciprocal movement of the welding machine 16 on the frame 82. The welding machine 16 is advanced back and forth on the slide surfaces 92, 94 and 96 by the action of a pair of piston cylinder assemblies generally designated by the numerals 98 and 100. As will be explained later in greater detail, each of the piston cylinder assemblies 98 and 100 are rigidly connected to the frame 82 and include an extensible piston rod 102 connected to the welding machine 16.

FIGS. 3 and 4 illustrate the actuated position of the cylinders 98 and 100 for moving the components 12 and 14 into the desired position for welding. FIG. 1 illustrates the piston cylinder assemblies 98 and 100 in their initial positions prior to advancement of the welding machine 16 on the frame 82 to the desired position for welding together the components 12 and 14.

The guide members 84 and 86 forming the fixed frame 82 each include a rearward end portion 104 and a forward end portion 106. The forward end portions 106, as illustrated in FIGS. 1–3, extend forwardly of the welding machine cap 24 in spaced parallel relation to the lower welding tong 28. The guide member end portions 106 rigidly support a workpiece clamping device generally designated by the numeral 108. The workpiece clamping device 108 includes an upper jaw 110 and a lower jaw 112 where the lower jaw 112 is maintained in a fixed position on the frame 82 for supporting a component of the workpiece or as illustrated the sheet metal duct section 12. The upper jaw 110 is pivotally mounted on the frame 82 for moving into and out of engagement with the duct section 12 opposite the point of engagement of the lower jaw 112 so that the workpiece component 12 or the duct section is immovably positioned relative to the other workpiece component or as illustrated the frame flange portion 14. The upper clamping jaw 110 is movable into and out of clamping engagement with the duct section 12 by operation of piston cylinder assemblies generally designated by the numerals 114 and 116. The assemblies 114 and 116 are each securely mounted on the fixed frame 82 and connected to the upper clamping jaw 110 by a linkage mechanism generally designated by the numeral 118.

Each of the jaws 110 and 112 include an inner end portion 120 and an outer end portion 122. The upper clamping jaw outer end portion 122 is bent toward the lower clamping jaw outer end portion 122. More specifically, as illustrated in FIG. 4, the upper clamping jaw 110 is formed by a pair of angularly shaped parallel arm members 124 and 126. The arm members 124 and 126 each include outer end portion 122. The end portions 122 are connected by welding to a transverse bar 128. Transverse bar 128 includes a threaded vertical aperture 130 extending through the bar 128 and centered between the arm members 124 and 126. The aperture 130 is arranged to threadedly receive a clamping tip 132 having a roughened or serrated end portion 124 arranged to engage the upper surface of the workpiece component 12 when the upper jaw 110 is pivoted into the clamping position as illustrated in FIGS. 2 and 3.

Positioned oppositely of the clamping tip 132 is a clamping tip 136 having a roughened or serrated end portion 138 for supporting the lower surface of the duct section 12. The clamping tip 136 is threadedly received within an aperture 140 of the lower clamping jaw outer end portion 122. The lower clamping jaw outer end portion 122 is also formed by a pair of arm members 124 and 126 as illustrated in FIG. 7 to support a transverse bar (not shown) for carrying the clamping tip 136. Thus with the above arrangement, in the clamping position, the tips 132 and 136 are pressed toward each other into engagement with the duct section 12 to securely position the duct section 12 therebetween.

The upper and lower clamping jaws 110 and 112 are positioned at the forward end portions 106 of the guide members 84 and 86 of the fixed frame 82. The guide member forward end portions 106 are connected in a suitable manner as by welding to a plate member 142. The plate member 142 is positioned between the arm members 84 and 86 in abutting relation with the surface 94 of each guide member and extends vertically upwardly from the guide members 84 and 86.

As illustrated in FIG. 7, the plate member 142 is provided with a lower centrally positioned elongated recess 144. The lower welding tong 28 extends through the recess 144 and is spaced from contact with the plate member 142. A workpiece positioning member generally designated by the numeral 146 extends through the recess 144 and is positioned above the lower tong 28. Positioned above and spaced from the elongated recess 144 is a second recess 148 that extends downwardly from the upper edge of the plate member 142. The upper movable welding tong 30 extends through the recess 148 in spaced relation to the plate member 142. The upper tong 30 is pivotal through an arcuate path generally designated by the numeral 150 in FIG. 7 in the recess 148.

Secured to the plate member 142 and extending forwardly therefrom on opposite sides of the upper recess 148 is a pair of pivot posts 152 and 154 and extending rearwardly from the plate member 142. Secured to the plate 142 on opposite sides of the lower recess 144 is a pair of pivot posts 156 and 158. Each of the pivot posts 152, 154, 156, and 158 includes a horizontal aperture 160 extending therethrough. The upper clamping jaw arm members 124 and 126 are pivotally connected to the pivot posts 152 and 154. The linkage mechanism 118 is pivotally connected to the pivot posts 156 and 158.

Now referring in greater detail to the linkage mechanism 118 illustrated in FIGS. 1-4, the upper clamping jaw link arm members 124 and 126 are pivotally connected intermediate their end portions to the pivots posts 152 and 154 by pins 162 that extend through bores in the arm members 124 and 126 aligned with the apertures 160. Similarly, at the inner end portions 120 of each of the upper clamping jaw link arm members 124 and 126, a pair of lever arms 164 are pivotally connected at one end portion to the arm member end portions 120 by pivot pins 166. A lower pair of lever arms 168 are pivotally connected at one end portion to the pivot posts 156 and 158 by pivot pins 170 that extend through the apertures 160 of the pivot posts 156 and 158. The adjacent ends of the pairs of lever arms 164 and 168 are pivotally connected to an elongated transverse pivot pin 172, illustrated in FIG. 4. The pivot pin 172 includes end portions 174 and 176 that are connected by clevis type connections 178 to the ends of extensible piston rods 180 of the piston cylinder assemblies 114 and 116. The piston rods 180 are extensible outward and inward relative to a cylinder portion 182 of the piston cylinder assembly 114 and 116. The assemblies 114 and 116 are preferably double acting pneumatic piston cylinder assemblies.

The cylinder portions 182 of the piston cylinder assemblies 114 and 116 each include pairs of rearwardly extending brackets generally designated by the numeral 184 which are pivotally connected by a pin member 186 to a brace 188. The brace 188 is secured to and extends upwardly from each of the guide members 84 and 86 of the fixed frame 82. Thus with this arrangement the cylinder portions 182 are fixed for pivotal movement on the fixed frame 82.

Upon actuation of the piston cylinder assemblies 114 and 116, the piston rods 180 are extended from their retracted position as illustrated in FIG. 1 to the position illustrated in FIGS. 2 and 3 to, in turn, pivot the upper and lower lever arms 164 and 168 on the transverse pivot pin 172. This pivots the upper clamping jaw arm members 124 and 126 on the pivot pins 162 and 166 to move the upper clamping jaw arm members 124 and 126 into clamping engagement with the workpiece component 12 so that it is rigidly secured in abutting contact with the clamping tips 132 and 136.

Now referring to the workpiece compontent positioning member 146 that is operable to move the workpiece 14 into a predetermined position relative to the workpiece component 12, the workpiece component positioning member 146 includes an upstanding channel shaped member 190. The member 190 includes a pedestal portion 192 and a wall portion 194 extending vertically upwardly and connected to pedestal portion 192. The pedestal portion 192 is provided with a preselected transverse dimension for receiving the workpiece component 14, as determined by the transverse dimension of the component 14. The channel shaped member 190 is centrally positioned in underlying relation with the upper clamping jaw lever arm members 124 and 126 by a support arm 196 that extends forwardly from the welding machine 16.

The channel shaped member 190 is rigidly secured in a conventional manner such as by welding to the outer end of the support arm 196. The inner end of the support arm 196 is suitably connected also as by welding to a transverse member 198 which is secured by bolts 200 to the cap 24 of the welding machine 16. With this arrangement the channel shaped member 190 is rigidly secured to the welding machine 16.

As illustrated in FIG. 3 the channel shaped member 190 is positioned in spaced relation with the welding tips 58 and 60 when the tips 58 and 60 are pivoted into the position for welding, as illustrated in FIG. 3. By selecting the distance between the point of engagement of the welding tips 58 and 60 with the workpiece to be welded and the front surface of the wall portion 194 that abuts the workpiece component 14, the position of the spot weld 78 is precisely located. In this manner a spot weld is located at a preselected location where the workpiece components are in abutting relation for spot welding.

Now referring to the manner in which the welding machine 16 is slidably positioned on the frame guide members 84 and 86, the welding machine 16, as illustrated in FIGS. 5 and 6, includes upper and lower elongated flange members 202 and 204. The flange members 202 and 204 are positioned in spaced parallel relation and are secured to the welding machine by a plurality of bolts 206. The pair of flange members 202 include lower surfaces 208 positioned in slidable contact with the slide surfaces 92 of the guide members 84 and 86. Similarly, the pair of flange members 204 include upper surfaces 210 which are positioned in slidable contact with the slide surfaces 96 of the guide members 84 and 86.

The pairs of flange members 202 and 204 are slidably moveable on the fixed frame guide members 84 and 86 upon actuation of the piston cylinder assemblies 98 and 100. Each of the assemblies 98 and 100 includes a cylinder portion 212 and the extensible piston rod 102 that is operable to extend and retract relative to the cylinder portion 212. Preferably the piston cylinder assemblies 98 and 100 are double acting assemblies and include suitable conduits (not shown) for supplying air under pressure to opposite ends of the cylinder portions to extend and retract the piston rods.

The piston cylinder assemblies 98 and 100 are similtaneously operated to either extend or retract the piston rods. The same arrangement is also applicable to the piston cylinder assemblies 114 and 116 for operating the workpiece clamping device. The details of the connection of the air conduits have been deleted for purposes of clarity of the illustration.

Each of the piston rods 102 of the piston cylinder assemblies 98 and 100 is connected by a clevis type joint generally designated by the numeral 214 to a support arm 216. The support arms 216 extend transversely relative to the guide members 84 and 86 and are positioned, as illustrated in FIG. 5, on a transversely extending shoulder 218 of the welding machine body portion 18. Preferably the support arms 216 are welded to the shoulders 218. In this manner the piston rods 102 are rigidly connected to the welding machine 16.

Each of the cylinder portions 212 of the assemblies 98 and 100 are provided at the opposite end of the piston rods 102 with a pair of brackets generally designated by the numeral 220. The brackets 220 are arranged to receive the end of the brace 188. The brace 188 is connected to each bracket 220 by a pin member 222 that extends through aligned bores of the brackets 220 and the brace 188. With this arrangement the cylinder portions 212 are rigidly secured to the guide members 84 and 86 of the fixed frame 82.

As illustrated in FIG. 1 the piston rods 102 of the piston cylinder assemblies 98 and 100 are initially extended so that the welding machine 16 is positioned in a rearmost position on the guide members 84 and 86. Further as illustrated in FIG. 1, when the piston rods 102 are extended the support channel shaped member 190 is positioned adjacent to the fixed plate member 142. Upon actuation of the piston cylinder assemblies 98 and 100 to retract the piston rods 102 into the cylinders 212, the welding machine 16 is moved forwardly on the guide members 84 and 86. Consequently as illustrated in FIG. 2 after the sheet metal duct section 12 is initially positioned within the duct receiving leg portion 62 of the flange frame portion 14, the workpiece component positioning member 146 abutting the flange frame portion 14 is moved forwardly until the end 74 of the duct 12 abuts the rear wall 68 of the channel shaped leg portion 64. Regardless of the initial position, as illustrated in FIG. 1, of the flange frame portion 14 on the sheet metal duct section 12, the flange frame portion 14 will be advanced until the end 74 of the duct 12 abuts the rear wall 68 and a preselected resistance is exerted by the sheet metal duct section 12 against the rear wall 68. When the pressure exerted upon the forwardly advancing positioning member 146 exceeds a preselected pressure, the forward urging of the flange frame portion 14 by the positioning member 146 is maintained until the welding operation is completed. The force exerted by the forwardly moving welding machine 16 also serves to maintain the workpiece components in position for welding.

The operation of the piston cylinder assemblies 98 and 100 to forwardly advance the workpiece component 14 into the predetermined position relative to the workpiece component 12 follows actuation of the piston cylinder assemblies 114 and 116. As above described the piston cylinder assemblies 114 and 116 are operable to engage the clamping device 108 in rigid engagement with the workpiece component 12. In this manner the workpiece component 12 is rigidly fixed relative to the workpiece component 14. Preferably as illustrated in FIG. 1 the workpiece components 12 and 14 are initially positioned relative to one another with the component 12 positioned on the clamping tip 136 and the component 14 positioned on the pedestal 192 of the channel shaped member 190.

After the initial positioning of the components 12 and 14 on the apparatus 10 the upper clamping jaw 110 is pivoted downwardly to engage the workpiece component 12. Thereafter as illustrated in FIG. 2, the piston cylinder assemblies 98 and 100 are actuated to move the workpiece component 14 into the predetermined position with respect to the workpiece component 12 for welding. As above discussed with the present invention the final position of the components 12 and 14 with respect to one another is controlled to assure that the spot welds 78 made along the workpiece are at the same distance from the end of the flange. Finally, by actuation of the piston cylinder assembly 48, controlling the pivotal movement of the upper welding tong 30, the welding tong 30 is moved to the position illustrated in FIG. 3. By precisely locating the position of the positioning member or ram 146 relative to the welding tongs 28 and 30 and the corresponding welding tips 58 and 60, the position of the spot weld 78 is fixed for each welding operation.

Once the welding tips 58 and 60 are in the position contacting the workpieces, the welder 16 is actuated to perform the spot weld 78. Once the spot weld is made, the process is repeated whereby the respective cylinders are actuated to upwardly pivot the welding tong 30, followed by retraction of the positioning member 146 to the position illustrated in FIG. 1. Finally the upper clamping jaw 110 is released from engagement with the workpiece component 12. At this point the apparatus is free to be moved to other locations on the workpiece for similar spot welding operations.

Although the positioning apparatus has been illustrated and described in conjunction with a spot welding machine, it should be understood that the positioning apparatus may be used with other types of fastening or securing devices.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for positioning and securing components of a workpiece comprising,
a welding machine frame, said welding machine frame being fixedly positioned,
a welding machine positioned for longitudinal movement on said welding machine frame,
said welding machine including a pair of opposed electrode devices adaptable to apply welding pressure to the workpiece components and transmit welding current to the workpiece components for welding the components together, means connected to at least one of said pair of electrode devices and said welding machine for moving one of said pair of electrode devices into and out of welding position, guide means positioned on said welding machine frame for slidably supporting said movable welding machine for longitudinal movement on said welding machine frame into and out of a predetermined position for welding, clamping means secured to said welding machine frame for engaging a first workpiece component to secure said first workpiece component on said welding machine frame in fixed position relative to the movable welding machine, said clamping means being movable into and out of engagement with said first workpiece component, a positioning member fixedly attached to said movable welding machine and being adapted to abut a second workpiece component, said positioning member being movable with said movable welding machine to move said second workpiece component to a predetermined position relative to said first workpiece component for welding said second workpiece component to said first workpiece component, actuating means mounted on said frame and operatively connected to said welding machine for advancing said welding machine on said guide means to simultaneously move said welding machine and said positioning member to move said second workpiece component relative to said first workpiece component into said predetermined position for welding said second workpiece component to said first workpiece component, said pair of electrode devices being movable into welding position after said workpiece components are moved into said predetermined position for welding, and said positioning member being arranged to move said second workpiece component relative to said first workpiece component to a preselected location on said first workpiece component for welding while said clamping means engaged to said first workpiece component maintains said first workpiece component fixed relative to said movable welding machine and said positioning member.

2. Apparatus for positioning and securing components of a workpiece as set forth in claim 1 which includes, second actuating means secured to said welding machine frame for moving said clamping means between a first position disengaged from said first workpiece component and a second position engaged to said first workpiece component, and said second actuating means having a first portion connected to said welding machine frame and a second portion connected to said clamping means, said second portion being movable relative to the first portion.

3. Apparatus for positioning and securing components of a workpiece as set forth in claim 1 which includes, pivot means for pivotally mounting said clamping means on said welding machine frame, a piston cylinder assembly for pivoting said clamping means into and out of engagement with said first workpiece component, said piston cylinder assembly being connected to said welding machine frame, and a linkage mechanism connecting said piston cylinder assembly to said pivot means to permit pivotal movement of said clamping means on said welding machine frame upon actuation of said piston cylinder assembly.

4. Apparatus for positioning and securing components of a workpiece as set forth in claim 1 which includes, means for securing said positioning member to said welding machine so that upon movement of said welding machine by operation of said actuating means the second workpiece component is moved together with said welding machine to a predetermined position relative to the first workpiece component.

5. Apparatus for positioning and securing components of a workpiece as set forth in claim 1 in which, said actuating means includes a piston cylinder assembly mounted on said welding machine frame, said piston cylinder assembly having a cylinder portion with an extensible piston rod movable into and out of said cylinder portion, said cylinder portion being connected to said welding machine frame, said piston rod having an end portion connected to said welding machine, and said piston cylinder assembly being operable upon actuation to extend and retract said piston rod to reciprocate said welding machine longitudinally on said guide means.

6. Apparatus for positioning and securing components of a workpiece as set forth in claim 1 in which said welding machine frame includes, a plurality of fixed angle members adapted for slidably supporting said welding machine to permit slidable movement of said welding machine on said welding machine frame, said angle members extending longitudinally relative to said welding machine, and said angle members being arranged to support said clamping means in a preselected position for movement of said clamping means into and out of engagement with said first workpiece component.

7. Apparatus for positioning and securing components of a workpiece as set forth in claim 1 in which, said positioning member includes an arm member having first and second end portions, said first end portion being connected to said welding machine, said second end portion being positioned a predetermined distance from said welding machine, a channel shaped member connected to said arm member second end portion, said channel shaped member having a base portion and an upstanding wall portion extending upwardly from said base portion, said base portion being arranged to receive said second workpiece component in abutting relation with said upstanding wall portion, and said channel shaped member being operable upon actuation of said actuating means to move with said welding machine to move said second workpiece component to a predetermined position in abutting relation with said first workpiece component for welding of the first and second workpiece components together at a predetermined location.

8. Apparatus for positioning and securing components of a workpiece as set forth in claim 1 which includes,
   said positioning member having a preselected configuration adapted to abut said second workpiece component for movement to a preselected position on said first workpiece component and to maintain said second workpiece component in said preselected position for connection to said first workpiece component.

9. Apparatus for positioning and securing components of a workpiece as set forth in claim 1 which includes,
   a plurality of flange members adapted for connection to said welding machine,
   said flange members being positioned in abutting, slidable relation with said guide means, and
   said flange members being arranged upon actuation of said actuating means for reciprocal movement on said guide means to move said welding machine in a preselected direction on said guide means.

* * * * *